(12) United States Patent
Hüger et al.

(10) Patent No.: US 11,500,382 B2
(45) Date of Patent: Nov. 15, 2022

(54) CONFIGURATION OF A CONTROL SYSTEM FOR AN AT LEAST PARTIALLY AUTONOMOUS TRANSPORTATION VEHICLE

(71) Applicant: VOLKSWAGEN AKTIENGESELLSCHAFT, Wolfsburg (DE)

(72) Inventors: Fabian Hüger, Wolfenbüttel (DE); Peter Schlicht, Wolfsburg (DE); Ruby Moritz, Wolfsburg (DE)

(73) Assignee: VOLKSWAGEN AKTIENGESELLSCHAFT, Wolfsburg (DE)

( * ) Notice: Subject to any disclaimer, the term of this patent is extended or adjusted under 35 U.S.C. 154(b) by 327 days.

(21) Appl. No.: 16/702,799

(22) Filed: Dec. 4, 2019

(65) Prior Publication Data
US 2020/0183391 A1 Jun. 11, 2020

(30) Foreign Application Priority Data
Dec. 5, 2018 (DE) ...................... 10 2018 221 063.2

(51) Int. Cl.
*G05D 1/00* (2006.01)
*G05D 1/02* (2020.01)
(Continued)

(52) U.S. Cl.
CPC ......... *G05D 1/0088* (2013.01); *G05D 1/0077* (2013.01); *G05D 1/0221* (2013.01);
(Continued)

(58) Field of Classification Search
CPC .. G05D 1/0088; G05D 1/0077; G05D 1/0221; G05D 2201/0213; G06N 3/0454; G06N 3/084; G06Q 50/30
See application file for complete search history.

(56) References Cited

U.S. PATENT DOCUMENTS

2017/0123429 A1\* 5/2017 Levinson ............... G01C 21/34
2018/0053091 A1 2/2018 Savvides
(Continued)

FOREIGN PATENT DOCUMENTS

CN 101872171 A 10/2010
CN 107977706 A 5/2018
(Continued)

OTHER PUBLICATIONS

EP3667568 European search opinion filed May 14, 2020. Retrived from https://patentscope.wipo.int/search/en/detail.jsf?docId=EP296531685&_fid=US296011388 (Year: 2020).\*
(Continued)

*Primary Examiner* — Calvin Cheung
(74) *Attorney, Agent, or Firm* — Barnes & Thornburg, LLP

(57) ABSTRACT

A method, a computer program with instructions, and an apparatus for configuring a control system for an at least partially autonomous transportation vehicle. Data relating to the driving situation are captured, selection criteria are then determined from the available data, two or more AI modules are selected from a library of AI modules during driving based on selection criteria, and combined execution of the selected two or more AI modules by the control system is initiated.

20 Claims, 3 Drawing Sheets

(51) Int. Cl.
*G06N 3/04* (2006.01)
*G06N 3/08* (2006.01)
*G06Q 50/30* (2012.01)

(52) U.S. Cl.
CPC ........... *G06N 3/0454* (2013.01); *G06N 3/084* (2013.01); *G06Q 50/30* (2013.01); *G05D 2201/0213* (2013.01)

(56) References Cited

U.S. PATENT DOCUMENTS

| | | | |
|---|---|---|---|
| 2018/0127000 A1* | 5/2018 | Jiang | G06N 20/00 |
| 2018/0203445 A1* | 7/2018 | Micks | G06F 30/20 |
| 2019/0101917 A1* | 4/2019 | Yao | B60W 50/0097 |
| 2019/0102674 A1* | 4/2019 | Kwant | G06F 16/93 |
| 2019/0205667 A1* | 7/2019 | Avidan | G06N 20/00 |
| 2019/0258251 A1* | 8/2019 | Ditty | G06F 15/7807 |

FOREIGN PATENT DOCUMENTS

| | | | | |
|---|---|---|---|---|
| CN | 108205731 A | 6/2018 | | |
| CN | 108229366 A | 6/2018 | | |
| CN | 108475056 A | 8/2018 | | |
| CN | 108885109 A | 11/2018 | | |
| DE | 102016009655 A1 | 4/2017 | | |
| DE | 102016000493 A1 | 7/2017 | | |
| DE | 102017006599 A1 | 3/2018 | | |
| DE | 102017107837 A1 | 10/2018 | | |
| WO | WO-2018224877 A1 | * | 12/2018 | ............ G06N 20/00 |
| WO | WO-2019049141 A1 | * | 3/2019 | ........... G06N 3/0454 |

OTHER PUBLICATIONS

Office Action for Chinese Patent Application No. 201911233555.X; dated Sep. 20, 2022.

* cited by examiner

CONFIGURATION OF A CONTROL SYSTEM FOR AN AT LEAST PARTIALLY AUTONOMOUS TRANSPORTATION VEHICLE

PRIORITY CLAIM

This patent application claims priority to German Patent Application No. 10 2018 221 063.2, filed 5 Dec. 2018, the disclosure of which is incorporated herein by reference in its entirety.

SUMMARY

Illustrative embodiments relate to a method, a computer program with instructions and an apparatus for configuring a control system for an at least partially autonomous transportation vehicle. Illustrative embodiments also relate to a transportation vehicle which uses such a method or such an apparatus.

BRIEF DESCRIPTION OF THE DRAWINGS

Further features become clear from the following description and the appended claims in conjunction with the figures.

DETAILED DESCRIPTION

Figure 1:
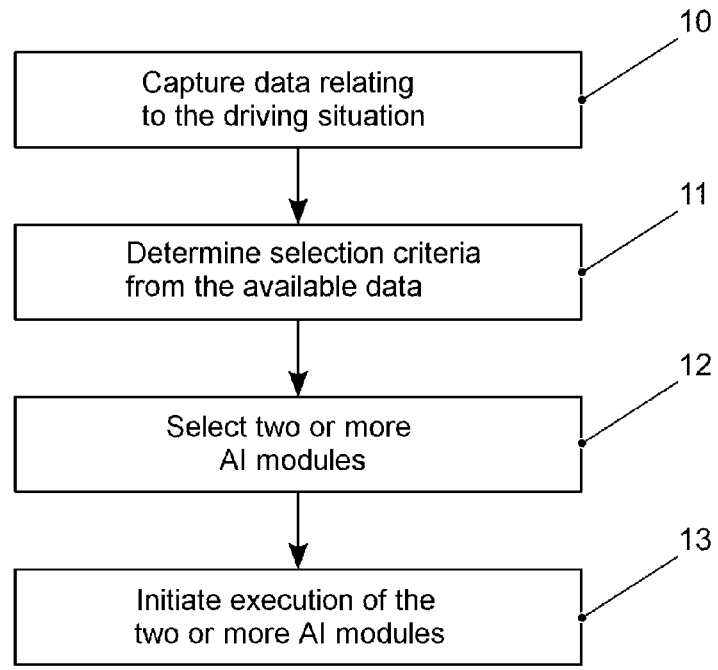
FIG. 1 schematically shows a method for configuring a control system for an at least partially autonomous transportation vehicle.

Highly automated driving is dependent on a safe, reliable and real-time capable transportation vehicle system. For this purpose, it is essential to redundantly design central functions for the purpose of failure safety. In this case, resources kept in multiples in the transportation vehicle are used, but without thereby improving the actual quality of the function. The more resources require these functions, the greater this discrepancy between costs and benefit in the transportation vehicle. This applies, in particular, to functions based on artificial intelligence (AI), for example, AI functions based on deep learning.

Against this background, DE 10 2017 006 599 A1 describes a method for operating a transportation vehicle which drives in an at least partially automated manner. In the method, at least three artificial neural networks are trained independently of one another in disjoint training drives of the transportation vehicle, in each case by an end-to-end approach on the basis of training actuator data from a transportation vehicle actuator system which are recorded during the training drives and on the basis of training sensor data from a transportation vehicle sensor system which are correlated with the training actuator data. During at least partially automated operation of the transportation vehicle, actual sensor data are captured as input data of the neural networks and training actuator data are assigned, as output data of the neural networks, to the actual sensor data on the basis of a comparison with the training sensor data. The training actuator data of all neural networks are supplied to a merging module which merges the training actuator data of all neural networks according to a predefined rule and determines actual actuator data on the basis of a result of the merging. Lateral and/or longitudinal control of the transportation vehicle is/are carried out in an at least partially automated manner on the basis of control of the transportation vehicle actuator system using the determined actual actuator data.

Furthermore, DE 10 2017 107 837 A1 describes an adaptable sensor arrangement. The sensor arrangement comprises at least one sensor element with a control and evaluation unit. The sensor data are evaluated using a classifier. The classifier has a neural network. The sensor arrangement can be connected to a superordinate computer network via an interface. The control and evaluation unit is designed for an expansion function. For this purpose, the sensor arrangement transmits sensor data, which are selected in an expansion function and are intended to be additionally processed by the classifier, to the computer network. A classifier is trained there on the basis of the sensor data and, after the training has been completed, the sensor arrangement receives classifier data for modifying the classifier such as parameters, program sections or even the entire trained classifier. The sensor arrangement is therefore also equipped to classify the selected sensor data.

The evaluation of video data as part of semantic segmentation is mentioned as a further example. According to the current prior art, functions which use neural networks do not have an alternative here.

Neural networks not only require a lot of computing capacity but are generally highly complex and are therefore extremely difficult to understand in terms of their method of operation. This circumstance is also a great challenge in the field of protection which is necessary for safety-relevant functions in the automotive context. It is impossible to protect a system which is not understood.

For conventional algorithms, there are methods for mathematically proving their correctness. However, these methods amount to nothing when using neural networks, which is why other approaches are required.

AI models based on neural networks have different properties depending on the training data and the structure of the models. In this case, training data may be, for example, data from training drives or synthetic training data. The properties of the AI models emerge, in particular, in functional and non-functional quality features. Many of these properties are relevant to safety, for example, the contextual dependence of the functional quality, the stability of the function, etc. In this case, the practice of developing an AI model which has adequately manifested all safety-relevant capabilities to comply with an acceptable safety concept is virtually excluded. Changing requirements which occur during driving also require differing manifestations of certain capabilities in dynamic alternation.

Such approaches when using artificial intelligence in transportation vehicles are restricted to the use of an individual AI module or an ensemble of AI modules and the optimization thereof. In this case, an AI module should be understood as meaning a software component in which an AI model is implemented. Concepts for redundancy are conventionally tackled, such as in aviation, by repeated execution in conjunction with monitoring systems. In this case, identical software components are executed twice or three times in a synchronous manner and their results are accordingly compared and used.

However, these concepts for redundancy have not been developed for AI modules, but rather for software components whose running behavior can be checked in a comparatively simple manner. In terms of their functionality, AI modules cover a gray area between "correct" and "incorrect" which is ignored by these redundancy concepts.

Disclosed embodiments provide an improved concept for configuring a control system for an at least partially autonomous transportation vehicle.

This is achieved by a method, a computer program with instructions, and an apparatus.

According to a first disclosed embodiment, a method for configuring a control system for an at least partially autonomous transportation vehicle comprises:
  selecting two or more AI modules from a library of AI modules during driving on the basis of selection criteria; and
  initiating execution of the two or more AI modules by the control system.

According to another disclosed embodiment, a computer program comprises instructions which, when executed by a computer, cause the computer to carry out the following operations for configuring a control system for an at least partially autonomous transportation vehicle:
  selecting two or more AI modules from a library of AI modules during driving on the basis of selection criteria; and
  initiating execution of the two or more AI modules by the control system.

In this case, the term computer should be broadly understood. It also comprises control devices and other processor-based data processing apparatuses.

The computer program can be provided for electronic retrieval, for example, or can be stored on a computer-readable storage medium.

According to another disclosed embodiment, an apparatus for configuring a control system for an at least partially autonomous transportation vehicle has:
  a selection unit for selecting two or more AI modules from a library of AI modules during driving on the basis of selection criteria; and
  an execution controller for initiating execution of the two or more AI modules by the control system.

Previous approaches are restricted to using an AI model for a particular function, which model is used without change for all scenarios which are run through. In contrast, the disclosed approach does not concentrate on developing a function which operates well and safely in all situations, but rather on combining a set of good functions. The different AI modules are dynamically combined with one another and redundantly designed on the transportation vehicle side. In this case, any available AI module can be integrated in the transportation vehicle system irrespective of whether it has been internally or externally developed. An inherent property of this procedure is that results which are as good as those of the best function contained in the selection are always at least provided. As a result of the dynamic selection, however, the results are generally better than those provided by each function executed by the control system alone. The overall performance is therefore increased in comparison with the performance of the individual modules. The disclosed solution is distinguished by its high system availability, its safety and its adaptability.

The AI modules are provided in the transportation vehicle in a library in which a hundred or more AI modules can definitely be stored. A plurality of AI modules are selected for active operation from this library on the basis of the selection criteria. The computing capacities available in transportation vehicles in future will suffice to be able to operate three to four AI models in a parallel manner, for example. To generally protect relevant functions, they are present in a redundant form to be able to compensate for any failures or faults, that is to say different AI modules which perform the same function are available. Redundancy allows synchronous quality control of the active AI modules and a loss of efficiency or effectiveness which is known a priori if one or more AI modules fail due to a fault.

If the AI modules are combined in the transportation vehicle, a plurality of objectives are pursued in this case, which are likewise either of a functional or of a non-functional nature. It is not absolutely necessary to opt for the result of one of the redundantly present AI modules. Rather, it is also possible to combine the individual results for the purpose of increased functional and non-functional quality.

According to at least one disclosed embodiment, the selection criteria relate to a current driving situation, properties of other selected AI modules or an expected future. All of these facets influence which of the available AI modules should be used for a given situation. In the driving situation, it is possible to consider, for example, whether there is a motorway journey or an urban journey. The properties of the other selected AI modules relate to the required computing capacity or the quality of the AI module for a particular context, for example. The expected, changing future influences, for example, how long an active AI module can be used before it must be replaced with another AI module on account of a changed situation. An optimum system performance can be achieved for any situation by taking these selection criteria into account.

According to at least one disclosed embodiment, the AI modules are assessed by a backend. For this purpose, the AI module or the underlying AI model is checked for particular properties by the backend side and is meaningfully assessed on the basis of the semantic context. The driving situation, the environment, the weather, the time of day, etc. come into consideration, for example, as the semantic context. The results of the assessment are stored in the module properties and can be used by the transportation vehicle to select modules. In addition, new or changed AI modules can be transmitted to the transportation vehicle by the backend.

According to at least one disclosed embodiment, the assessment of the AI modules by the backend considers functional properties and non-functional properties of the AI modules. Functional properties relate, for example, to the recognition of special objects, the recognition of rare objects, the recognition of concealed objects, the consistency of the recognition, etc. The non-functional properties include, for example, the latency, the required computing capacity, the reliability, etc. A comprehensive assessment of the AI modules is ensured by taking both areas into account.

According to at least one disclosed embodiment, properties of the two or more AI modules are used to aggregate the results of the two or more AI modules for a current context. The aggregation can be carried out, for example, by offsetting, replacing or selecting, by objects or classes, the results of the two or more AI modules. Using the properties of the AI modules or of the underlying AI models for an aggregation allows the optimum output to be generated for the current context. In this case, the properties comprising information relating to the quality of the individual modules with regard to particular segmentation classes or particular contexts are used, for example. For example, an AI model may have a higher quality for the segmentation of pedestrians in an urban environment at night. This can be stored by a higher confidence value in the module properties.

According to at least one disclosed embodiment, when starting a newly selected AI module, an AI module to be replaced remains active until the newly selected AI module has started completely. While an AI module is being started, it is not yet fully ready for use, but already requires computing capacities. If one of the active AI modules is now replaced with a previously inactive module, the AI module to be replaced still remains active until the new AI module has been completely started up. In this case, although more computing capacities are used in the short term, a robust and safe system is enabled in this manner in the medium term.

According to at least one disclosed embodiment, three or four redundant AI modules are selected for execution. The computing capacities available in transportation vehicles in future are optimally used by operating three to four AI modules in a parallel manner.

A disclosed method or a disclosed apparatus is used in a transportation vehicle in a particularly beneficial manner.

For better understanding of the principles of the present disclosure, exemplary embodiments are explained in more detail below on the basis of the figures. It goes without saying that the disclosure is not restricted to these embodiments and that the described features can also be combined or modified without departing from the scope of protection of the disclosure defined in the appended claims.

FIG. 1 schematically shows a method for configuring a control system for an at least partially autonomous transportation vehicle. In a first operation at 10, data relating to the driving situation are captured. These may be, for example, environmental data from an environment sensor system installed in the transportation vehicle or operating parameters of the transportation vehicle which are provided by control devices. Selection criteria are then determined 11 from the available data. The selection criteria may relate, for example, to a current driving situation, properties of other selected AI modules or an expected future. In this case, additional boundary conditions, for example, an available computing capacity, can be taken into account, if necessary. Two or more AI modules are selected 12 from a library of AI modules during driving on the basis of the selection criteria. Three or four redundant AI modules may be selected in this case. Finally, execution of the selected two or more AI modules by the control system is initiated 13. During execution of the AI modules, properties of the AI modules can be used to aggregate the results of the AI modules for a current context. The aggregation can be carried out, for example, by offsetting, replacing or selecting, by objects or classes, the results of the AI modules. When starting a newly selected AI module, an AI module to be replaced may remain active until the newly selected AI module has completely started.

Figure 2:
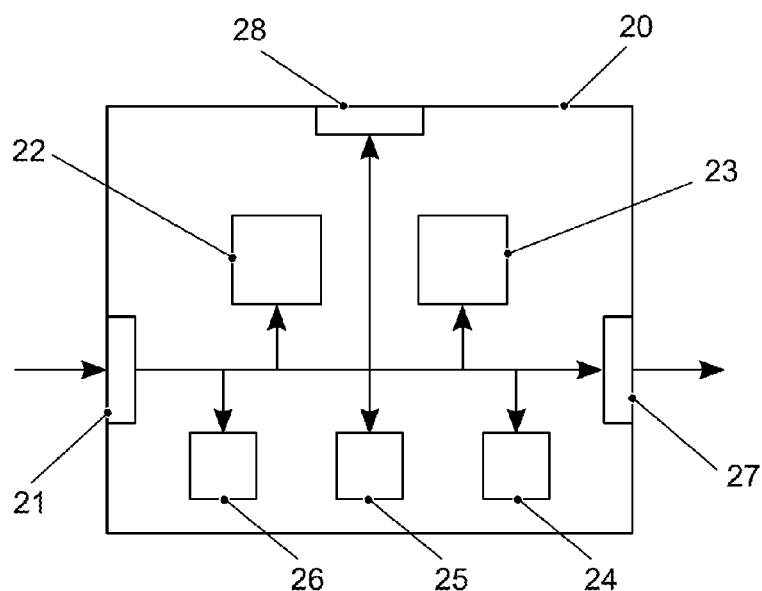
FIG. 2 shows a first embodiment of an apparatus for configuring a control system for an at least partially autonomous transportation vehicle.

FIG. 2 shows a simplified schematic illustration of a first embodiment of an apparatus 20 for configuring a control system for an at least partially autonomous transportation vehicle. The apparatus 20 has an input 21 which can be used to receive data relating to the driving situation. These may be, for example, environmental data from an environment sensor system installed in the transportation vehicle or operating parameters of the transportation vehicle which are provided by control devices. An evaluation unit 22 then determines selection criteria from the available data. The selection criteria may relate, for example, to a current driving situation, properties of other selected AI modules or an expected future. In this case, additional boundary conditions, for example, an available computing capacity, can be taken into account, if necessary. A selection unit 23 selects two or more AI modules from a library of AI modules during driving on the basis of the selection criteria. Three or four redundant AI modules may be selected by the selection unit 23. The library can be stored in a memory 26 of the apparatus 20, for example. An execution controller 24 initiates execution of the two or more AI modules by the control system. The control system is provided for further use via an output 27 of the apparatus 20. For this purpose, the AI modules used can be directly output to a processor, for example. Alternatively, only information relating to which AI modules are intended to be loaded can be output to a processor. During execution of the AI modules, properties of the AI modules can be used to aggregate the results of the AI modules for a current context. The aggregation can be carried out, for example, by offsetting, replacing or selecting, by objects or classes, the results of the AI modules. The execution controller 24 may ensure that, when starting a newly selected AI module, an AI module to be replaced remains active until the newly selected AI module has completely started.

The evaluation unit 22, the selection unit 23 and the execution controller 24 can be controlled by a monitoring unit 25. Settings of the evaluation unit 22, the selection unit 23, the execution controller 24 or the monitoring unit 25 can be changed, if necessary, via a user interface 28. The data arising in the apparatus 20 can be stored in the memory 26, if necessary, for example, for subsequent evaluation or for use by the components of the apparatus 20. The evaluation unit 22, the selection unit 23, the execution controller 24 and the monitoring unit 25 may be implemented as dedicated hardware, for example, as integrated circuits. However, they may naturally also be partially or completely combined or implemented as software which runs on a suitable processor, for example, on a GPU or CPU. The input 21 and the output 27 can be implemented as separate interfaces or as a combined bidirectional interface.

Figure 3:
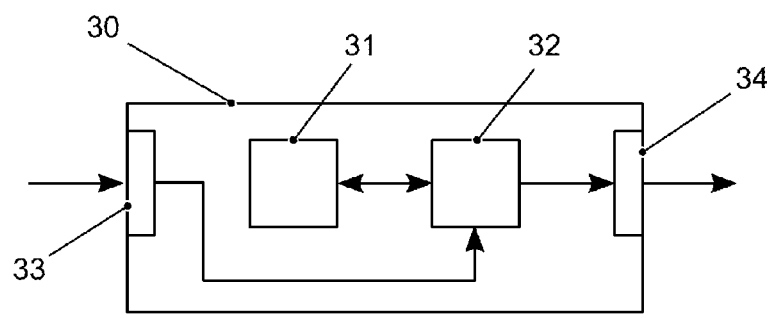
FIG. 3 shows a second embodiment of an apparatus for configuring a control system for an at least partially autonomous transportation vehicle.

FIG. 3 shows a simplified schematic illustration of a second embodiment of an apparatus 30 for configuring a control system for an at least partially autonomous transportation vehicle. The apparatus 30 has a processor 32 and a memory 31. The apparatus 30 is, for example, a computer or a control device. The memory 31 stores instructions which, when executed by the processor 32, cause the apparatus 30 to carry out the operations according to one of the described methods. The instructions stored in the memory 31 therefore embody a program which can be executed by the processor 32 and implements the disclosed method. The apparatus 30 has an input 33 for receiving information, for example, environmental data or operating parameters of the transportation vehicle. Data generated by the processor 32 are provided via an output 34. They can also be stored in the memory 31. The input 33 and the output 34 can be combined to form a bidirectional interface.

The processor 32 may comprise one or more processor units, for example, microprocessors, digital signal processors or combinations thereof.

The memories 26, 31 in the described embodiments may have both volatile and non-volatile memory areas and may comprise a wide variety of storage devices and storage media, for example, hard disks, optical storage media or semiconductor memories.

Figure 4:
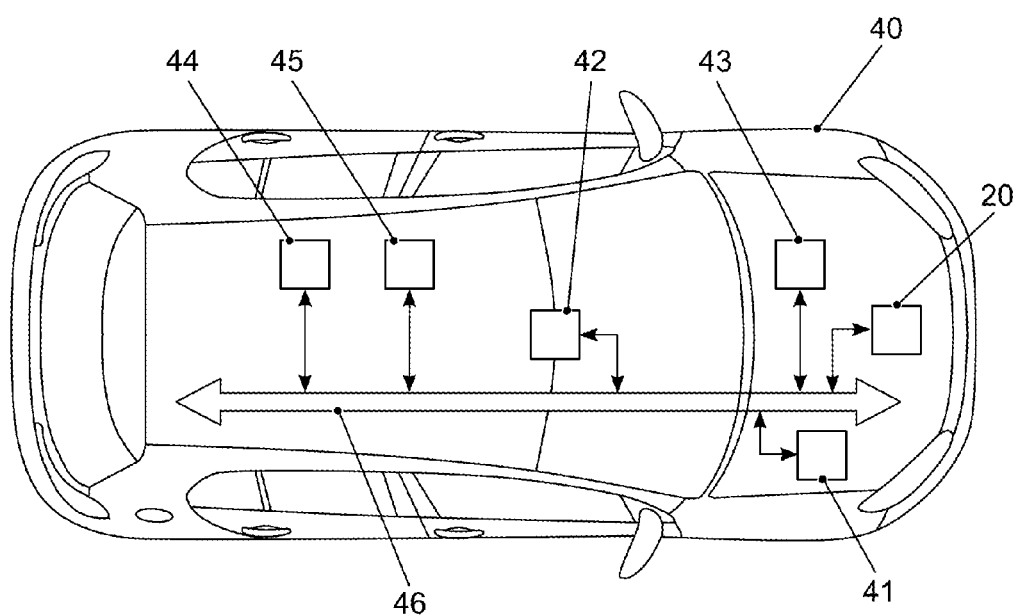
FIG. 4 schematically illustrates a transportation vehicle in which a solution according to the disclosed embodiments is implemented.

FIG. 4 schematically illustrates a transportation vehicle 40 in which a disclosed solution is implemented. The transportation vehicle 40 has a control system 41 for automated or highly automated driving, which control system is configured by an apparatus 20. In FIG. 4, the apparatus 20 is an independent component, but may also be integrated in the control system 41. The apparatus 20 uses data relating to the driving situation to select AI modules from a library of AI modules. These data may be, for example, environmental data from an environment sensor system 42 installed in the transportation vehicle 40 or operating parameters of the transportation vehicle 40 which are provided by control devices 43. A further component of the transportation vehicle 40 is a data transmission unit 44 which can be used, inter alia, to set up a connection to a backend, for example, to obtain additional or changed AI modules. A memory 45 is present for the purpose of storing the library of AI modules or further data. Data are interchanged between the various components of the transportation vehicle 40 via a network 46.

Figure 5:
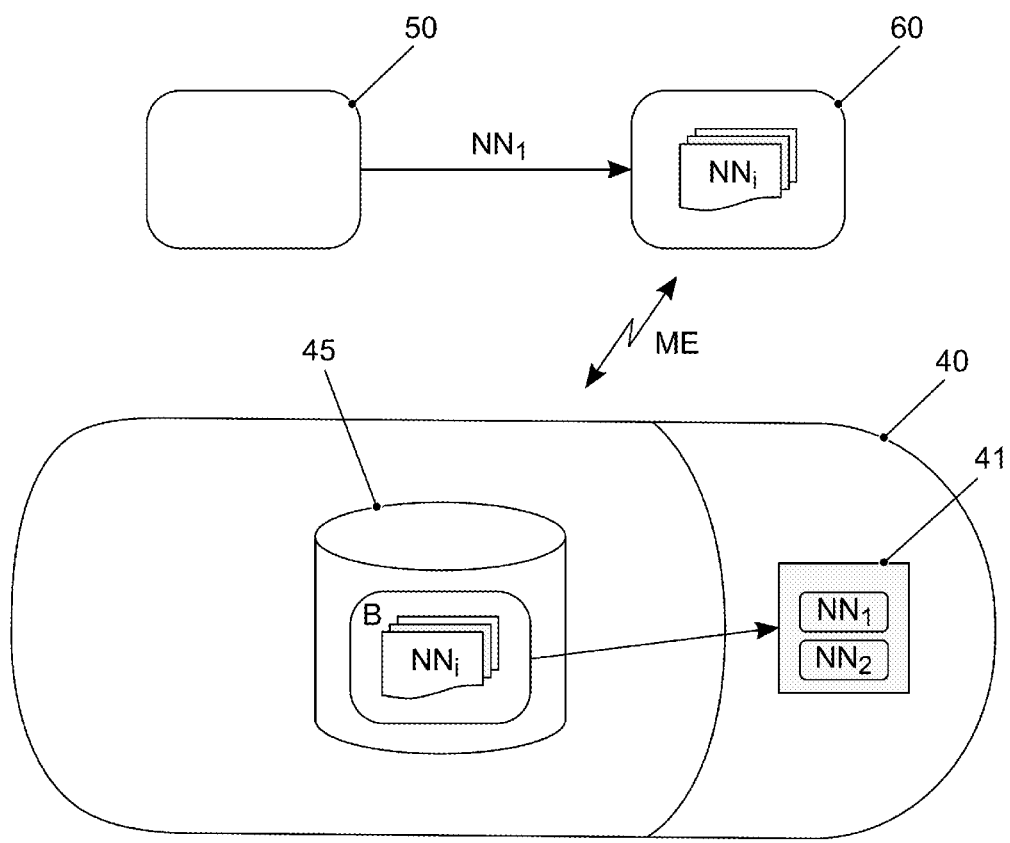
FIG. 5 schematically shows a system diagram of a solution according to the disclosed embodiments.

FIG. 5 schematically shows a system diagram of a disclosed solution. The system comprises a transportation vehicle 40, an external source 50 of AI modules NNi and a backend 60. A library B of AI modules NNi is held in a memory 45 of the transportation vehicle 40. These AI modules may have been internally developed by a manufacturer of the transportation vehicle 40 or may come from the external source 50. In the example, the AI module NN1 is provided by the external source 50. Irrespective of the origin, the AI modules NNi are assessed by the backend 60. In this case, functional properties and non-functional properties of the AI modules NNi are considered by the backend 60. Examples of functional properties are, for example, the recognition of special objects, the recognition of rare objects, the recognition of concealed objects, the consistency of the recognition, etc. Non-functional properties are, for example, the latency, the required computing capacity, the reliability, etc. The resulting assessments of the AI modules NNi are stored in the library B as module properties ME. Different AI modules are dynamically combined with one another on the transportation vehicle side and are redundantly executed by a control system 41 of the transportation vehicle 40 on the basis of selection criteria and a comparison with the module properties ME. In the example, these are the two AI modules NN1 and NN2.

LIST OF REFERENCE SIGNS

10 Capture data relating to the driving situation
11 Determine selection criteria from the available data
12 Select two or more AI modules
13 Initiate execution of the two or more AI modules
20 Apparatus
21 Input
22 Evaluation unit
23 Selection unit
24 Execution controller
25 Monitoring unit
26 Memory
27 Output
28 User interface
30 Apparatus
31 Memory
32 Processor
33 Input
34 Output
40 Transportation vehicle
41 Control system
42 Environment sensor system
43 Control device
44 Data transmission unit
45 Memory
46 Network
50 External source
60 Backend
B Library
ME Module properties
NN$_i$ AI module

The invention claimed is:

1. An apparatus for configuring a control system for an at least partially autonomous transportation vehicle, the apparatus comprising:
   a backend for assessing each AI module of a library of AI modules, the assessment evaluating functional properties relating to object recognition by the AI module and non-functional properties relating to computing resource requirements of the AI module;
   a selection unit for selecting two or more of the AI modules during driving operation of the transportation vehicle based on selection criteria including a driving situation of the transportation vehicle and on the assessment; and
   an execution controller for initiating execution of the two or more AI modules by the control system.

2. The apparatus of claim 1, wherein the selection criteria further include properties of other selected AI modules or an expected future.

3. The apparatus of claim 1, wherein properties of the two or more AI modules are used to aggregate the results of the two or more AI modules for a current context.

4. The apparatus of claim 3, wherein the aggregation is carried out by calculating, replacing or selecting, by objects or classes, the results of the two or more AI modules.

5. The apparatus of claim 1, wherein, when starting a newly selected AI module, an AI module to be replaced remains active until the newly selected AI module has started completely.

6. The apparatus of claim 1, wherein three or four redundant AI modules are selected for execution.

7. A method for configuring a control system for an at least partially autonomous transportation vehicle, the method comprising:
   assessing each AI module of a library of AI modules, the assessment evaluating functional properties relating to object recognition by the AI module and non-functional properties relating to computing resource requirements of the AI module;
   selecting two or more of the AI modules during driving operation of the transportation vehicle based on selection criteria including a driving situation of the transportation vehicle and on the assessment; and
   initiating execution of the two or more AI modules by the control system.

8. The method of claim 7, wherein the selection criteria further include properties of other selected AI modules or an expected future.

9. The method of claim 7, wherein the AI modules are assessed by a backend.

10. The method of claim 7, wherein properties of the two or more AI modules are used to aggregate the results of the two or more AI modules for a current context.

11. The method of claim 10, wherein the aggregation is carried out by calculating, replacing or selecting, by objects or classes, the results of the two or more AI modules.

12. The method of claim 7, wherein, when starting a newly selected AI module, an AI module to be replaced remains active until the newly selected AI module has started completely.

13. The method of claim 7, wherein three or four redundant AI modules are selected for execution.

14. A non-transitory computer readable medium including a computer program with instructions which, when executed by a computer, cause the computer to carry out a method for configuring a control system for an at least partially autonomous transportation vehicle, the method comprising:
- assessing each AI module of a library of AI modules, the assessment evaluating functional properties relating to object recognition by the AI module and non-functional properties relating to computing resource requirements of the AI module;
- selecting two or more of the AI modules during driving operation of the transportation vehicle based on selection criteria including a driving situation of the transportation vehicle and on the assessment; and
- initiating execution of the two or more AI modules by the control system.

15. The non-transitory computer readable medium of claim 14, wherein the selection criteria further include properties of other selected AI modules or an expected future.

16. The non-transitory computer readable medium of claim 14, wherein the AI modules are assessed by a backend.

17. The non-transitory computer readable medium of claim 14, wherein properties of the two or more AI modules are used to aggregate the results of the two or more AI modules for a current context.

18. The non-transitory computer readable medium of claim 17, wherein the aggregation is carried out by calculating, replacing or selecting, by objects or classes, the results of the two or more AI modules.

19. The non-transitory computer readable medium of claim 14, wherein, when starting a newly selected AI module, an AI module to be replaced remains active until the newly selected AI module has started completely.

20. The non-transitory computer readable medium of claim 14, wherein three or four redundant AI modules are selected for execution.

* * * * *